(12) United States Patent
Sasaki

(10) Patent No.: US 9,275,091 B2
(45) Date of Patent: Mar. 1, 2016

(54) DATABASE MANAGEMENT DEVICE AND DATABASE MANAGEMENT METHOD

(75) Inventor: Shigero Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 258 days.

(21) Appl. No.: 14/000,693

(22) PCT Filed: Nov. 7, 2011

(86) PCT No.: PCT/JP2011/006220
§ 371 (c)(1),
(2), (4) Date: Aug. 21, 2013

(87) PCT Pub. No.: WO2012/114402
PCT Pub. Date: Aug. 30, 2012

(65) Prior Publication Data
US 2013/0332465 A1  Dec. 12, 2013

(30) Foreign Application Priority Data
Feb. 22, 2011 (JP) .................. 2011-035437

(51) Int. Cl.
*G06F 17/30* (2006.01)
*G06F 7/00* (2006.01)

(52) U.S. Cl.
CPC ...... *G06F 17/30327* (2013.01); *G06F 17/3002* (2013.01); *G06F 17/30091* (2013.01); *G06F 17/30138* (2013.01); *G06F 17/30333* (2013.01); *G06F 17/30336* (2013.01); *G06F 17/30613* (2013.01); *G06F 17/30911* (2013.01)

(58) Field of Classification Search
None
See application file for complete search history.

(56) References Cited

U.S. PATENT DOCUMENTS

| | | | |
|---|---|---|---|
| 2005/0091188 A1* | 4/2005 | Pal et al. | 707/1 |
| 2006/0155752 A1* | 7/2006 | Hrle et al. | 707/102 |
| 2007/0016582 A1* | 1/2007 | Kawamura et al. | 707/7 |
| 2007/0162421 A1* | 7/2007 | Pang et al. | 707/2 |
| 2009/0037367 A1* | 2/2009 | Wein | 707/2 |
| 2010/0106695 A1* | 4/2010 | Calder et al. | 707/696 |

(Continued)

FOREIGN PATENT DOCUMENTS

| | | | |
|---|---|---|---|
| JP | 5-334153 A | 12/1993 | |
| JP | 7-200376 A | 8/1995 | |

(Continued)

OTHER PUBLICATIONS

Douglas Comer, "Ubiquitous B-Tree," ACM Computing Surveys, Jun. 1979, vol. 11, No. 2, pp. 121-137.

(Continued)

*Primary Examiner* — Dung K Chau
(74) *Attorney, Agent, or Firm* — Sughrue Mion, PLLC

(57) ABSTRACT

A database management device includes: plural index blocks that have an index entry and an access counter including a read counter and a write counter; an access management unit that updates the read counter in response to a read access to an index block and updates the write counter in response to an update access to the index block; an extended block manipulation unit that acquires an extended block not identified with an index entry of another index block and serving as a destination of storing a new index entry on the basis of a result of comparison between the read counter and the write counter of a leaf block serving as a target of inserting the new index entry, and sets identification information for identifying the extended block to the leaf block serving as the target of insertion.

9 Claims, 8 Drawing Sheets

(56) References Cited

U.S. PATENT DOCUMENTS

| | | | |
|---|---|---|---|
| 2010/0257181 A1* | 10/2010 | Zhou et al. | 707/747 |
| 2010/0281005 A1* | 11/2010 | Carlin et al. | 707/696 |
| 2010/0325169 A1* | 12/2010 | Loh et al. | 707/803 |
| 2011/0055257 A1* | 3/2011 | Renkes et al. | 707/769 |
| 2011/0131200 A1* | 6/2011 | Zhou et al. | 707/714 |

FOREIGN PATENT DOCUMENTS

| | | |
|---|---|---|
| JP | 2615046 B2 | 5/1997 |
| JP | 2708657 B2 | 2/1998 |
| JP | 2003-345832 A | 12/2003 |
| JP | 2007-200161 A | 8/2007 |

OTHER PUBLICATIONS

"Oracle Database Concepts," 10g Release 2, part No. B19215-02, Mar. 2006 (FIG. 5 to FIG. 7), http://otndnld.oracle.co.jp/document/products/oracle10g/102/doc_cd/server.102/B19215-02.pdf.

"Oracle Database Performance Tuning Guide," 10g Release 2 (10.2), part No. B19207-02, May 2008, 2-12 (Application Design Principles), http://otndnld.oracle.co.jp/document/products/oracle10g/102/doc_cd/server.102/B19207-02.pdf.

International Search Report of PCT/JP2011/006220 dated Dec. 13, 2011.

* cited by examiner

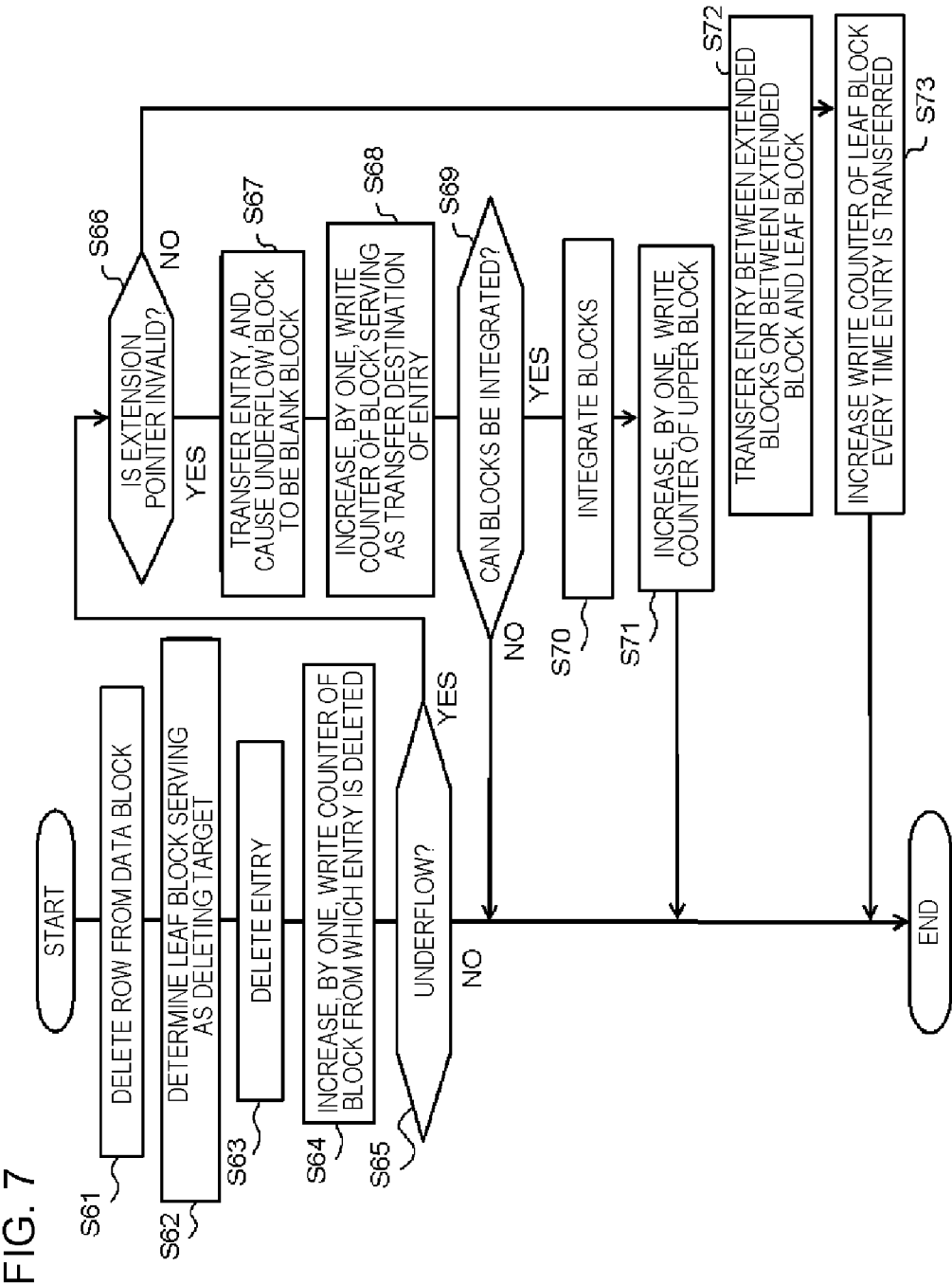

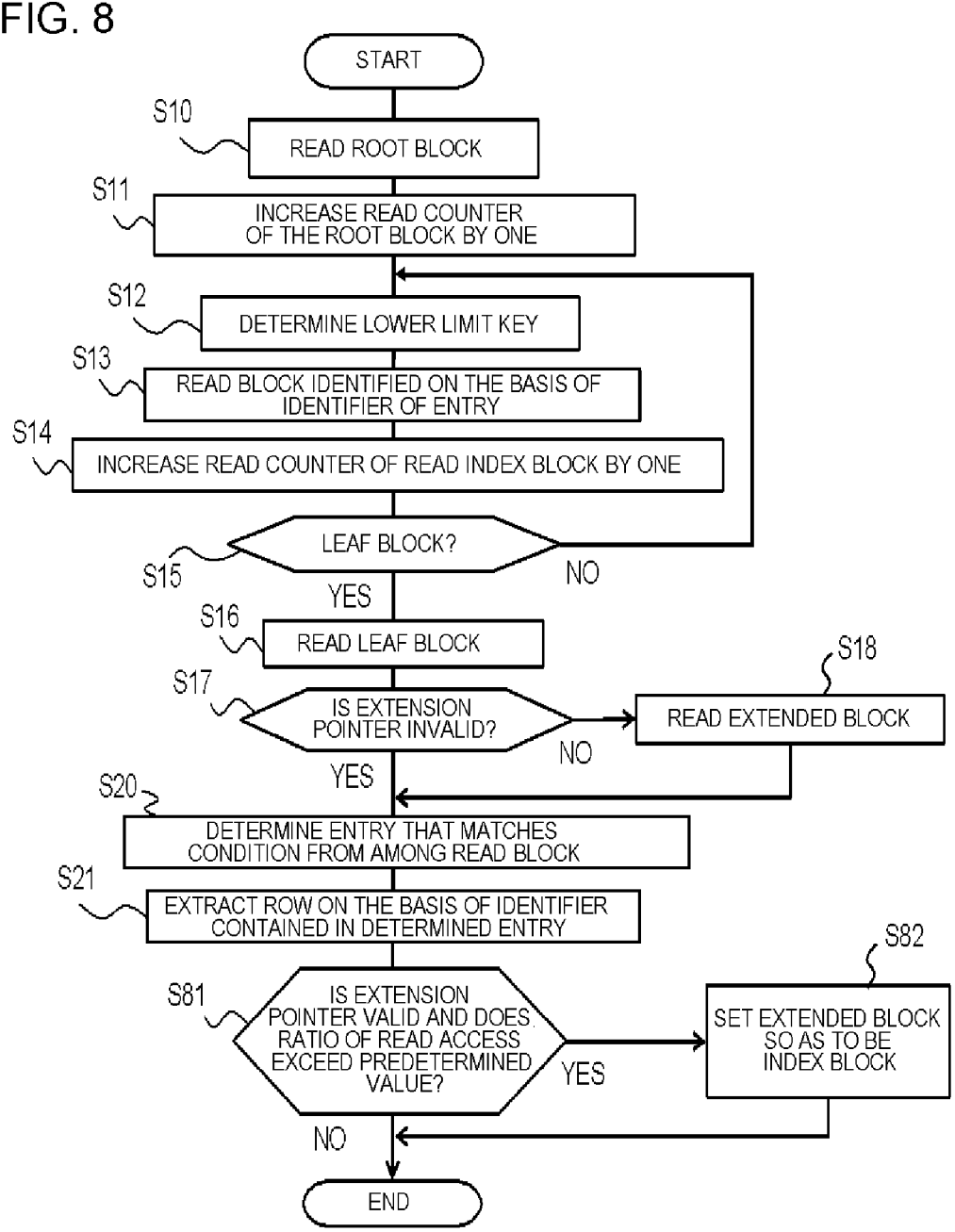

DATABASE MANAGEMENT DEVICE AND DATABASE MANAGEMENT METHOD

CROSS REFERENCE TO RELATED APPLICATIONS

This is a National Stage of International Application No. PCT/JP2011/006220 filed Nov. 7, 2011, claiming priority based on Japanese Patent Application No. 2011-035437 filed Feb. 22, 2011, the contents of all of which are incorporated herein by reference in their entirety.

TECHNICAL FIELD

The present invention relates to a technique for managing databases having tree-structured indexes added thereto.

BACKGROUND ART

It is very common to add indexes to data to rapidly search a large amount of data for a small amount of data. As the target for which the searching process is frequently performed, databases are used. Of the databases, a relational database that manages data in a tabular form is one of the most widely used databases. A table is formed by rows and columns, and for example, one row contains data concerning one transaction. The row is formed by plural columns, and for example, a certain column contains date data, while another column contains a sales figure.

In this case, the total amount of sales at a specific date can be obtained, for example, through full scan or index scan. In the full scan, examination for all the rows is made as to whether the dates are matched or not, and the sales figures in the matched rows are added up. In the index scan, the rows having the date matched with each other are specified using indexes, whereby the total of the sales figures can be obtained from the specified rows. This index scan is efficient when the number of rows having the date matched is sufficiently small as compared with the number of all the rows.

A B-tree is known as a data structure that accommodates the indexes. For example, Non-patent Document 1 describes algorithms including searching with the B-tree, inserting of data into the B-tree, and deleting data in the B-tree. Non-patent Document 2 makes an explanation of the B-tree in ORACLE (trademark) in relation to the widely used relational database.

With the B-tree index, it is possible to search for the data with the calculation amount in proportion to "log n," where n is the number of rows. Note that the amount of calculation in the full scan is in proportion to the n.

Further, Patent Document 1 proposes an index management method of preparing indexes with plural tree structures and storing the key value in any one of the tree structures to reduce lock contention occurring when plural accesses occur to the same key value. With this method, the number of keys in the index is equalized, and the number of accesses is counted for each of the indexes, whereby it is possible to equalize the access load for each of the indexes.

Patent Document 2 proposes a method of managing a database, in which the number of lock contentions in the B-tree index is counted, and the B-tree is divided in the case where the large number of lock contentions occurs.

Patent Document 3 proposes a method of processing a record addition, in which, in the case where records are added to a balance tree such as the B-tree, the block is extended so as to have a size that can be read/written through one input/output process without the block being divided. Note that, with this method, the block division is performed after the block is extended to the maximum extendable size.

Patent Document 4 proposes a split control system in a data processing system managing data with a storage structure employing a non-dense B-tree cluster structure. With this method, the block division at the time of overflow is not immediately performed, and the target record is written into the overflow area, thereby reducing the overhead of the block division process.

Further, Non-patent Document 3 proposes a reverse-key index method designed so as to remove the hot spot in indexes in the inserting application. For example, in the case where the B-tree index is added to the column indicating the time when data is inserted, the write accesses are focused on the leaf block furthest to the right in the index (leaf block having the maximum value) and the branch block located above the leaf block. In order to avoid such a situation, which is called a right-growing index, the reverse-key index method is configured by reversing the key value in the index. More specifically, in the general index, a key value (102) and a key value (103) are inserted into the same block. However, in the reverse-key index, these key values are treated as the reversed values (201) and (301), and thus, are inserted into different blocks.

RELATED DOCUMENT

Patent Document

Patent Document 1: Japanese Patent Application Laid-open No. H05-334153
Patent Document 2: Japanese Patent Application Laid-open No. H07-200376
Patent Document 3: Japanese Patent No. 2615046
Patent Document 4: Japanese Patent No. 2708657

Non-Patent Document

Non-patent Document 1: Corner, D. "Ubiquitous B-Tree," ACM Computing Surveys, vol. 11, no. 2, p. 121-137, June 1979
Non-patent Document 2: "Oracle Database Concepts," 10g Release 2, part number: B19215-02, March 2006 (FIG. 5 to FIG. 7), http://otndnld.oracle.co.jp/document/products/oracle10g/1 02/doc_cd/server.102/B19215-02.pdf
Non-patent Document 3: "Oracle Database Performance Tuning Guide," 10g Release 2 (10.2), part number: B19207-02, May 2008, 2-12 (Application Design Principles), http://otndnld.oracle.co.jp/document/products/oracle10g/1 02/doc_cd/server.102/B19207-02.pdf

SUMMARY OF THE INVENTION

In general, although the database having the B-tree indexes added thereto can be searched rapidly, the speed at which data are inserted and deleted is slow. For the database that does not have the B-tree indexes added thereto, it is only necessary to insert or delete data by manipulating the data stored simply as a table. However, at the time of inserting and deleting the data stored in the table having the B-tree indexes added thereto, the data stored in the B-tree also needs to be manipulated. Further, in the B-tree, there is a possibility that blocks themselves are added and deleted due to excess in or lack of the available area in the blocks to be manipulated. In such a case, it is necessary to manipulate the data in a block located in the upper layer.

Thus, the configuration of adding indexes to the database and the configuration of not adding any index to the database have both merits and demerits. This means that there is a possibility that, from the viewpoint of the entire processing to the database, neither of the above two configurations can achieve sufficient performance. Such a problem may occur, for example, in the case where keys in the specific range are frequently inserted and searched. This is because write accesses are concentrated on the corresponding block in the case where the keys in the specific range are frequently inserted, and read accesses are concentrated on the corresponding block in the case where the keys in the specific range are frequently searched.

The problem described above also occurs as a result of the leaf block or the branch block storing a key having a close value. Thus, with the reverse-key index described above, it is possible to distribute the blocks subjected to the process of inserting the key in the specific range or the process of searching the keys in the specific range, which makes it possible to solve part of the problem described above.

However, the reverse-key indexes have a problem in that they cannot be used for range search. Further, the manager or operator of the database needs to accurately recognize the frequency of the search and insertion to determine whether or not to employ the reverse-key index.

An object of the present invention is to provide a database management technique for optimizing the performance of databases having the tree-structured index added thereto.

Each aspect of the present invention employs the following configuration to solve the problems described above.

A first aspect relates to a database management device that manages a database containing a data block storing tabular data. The database management device according the first aspect includes plural index blocks having a tree structure, and each having at least one index entry for identifying one piece of row data constituting the tabular data or another index block, and an access counter including a read counter and a write counter; an access management unit that updates the read counter in response to a read access to an index block and updates the write counter in response to an update access to the index block for each of the index blocks accessed along the tree structure in response to data manipulation of the tabular data; a data inserting unit that inserts a new index entry for identifying new row data to be inserted into the data block, into a leaf block serving as a target of insertion from among the plural index blocks; and an extended block manipulation unit that, on the basis of a result of comparison between the read counter and the write counter in the leaf block serving as the target of insertion, acquires an extended block not identified with an index entry of another index block and serving as a destination of storing the new index entry, and sets identification information for identifying the extended block to the leaf block serving as the target of insertion.

A second aspect relates to a database management method that manages a database containing a data block storing tabular data. The database management method according to the second aspect is performed by a computer storing plural index blocks having a tree structure, and each having at least one index entry for identifying one piece of row data constituting the tabular data or another index block, and an access counter including a read counter and a write counter, the computer: updates the read counter in response to a read access to an index block and updates the write counter in response to an update access to the index block for each of the index blocks accessed along the tree structure in response to data manipulation of the tabular data; inserts a new index entry for identifying new row data to be inserted into the data block, into a leaf block serving as a target of insertion from among the plural index blocks; acquires an extended block not identified with an index entry of another index block and serving as a destination of storing the new index entry, on the basis of a result of comparison between the read counter and the write counter in the leaf block serving as the target of insertion; and sets identification information for identifying the extended block to the leaf block serving as the target of insertion.

Another aspect of the present invention may provide a program that causes a computer to realize each of the configurations of the first aspect described above, or a computer-readable storage medium that stores the program. The storage medium includes a non-transitory tangible medium.

According to each of the aspects described above, it is possible to provide a database management technique for optimizing the performance of the database having the tree-structured index added thereto.

BRIEF DESCRIPTION OF THE DRAWINGS

FIG. 7 is a flowchart showing an example of an operation performed by the database (DB) system at the time of data deletion according to the first exemplary embodiment.

FIG. 8 is a flowchart showing an example of an operation performed by the database (DB) system according to a second exemplary embodiment.

DESCRIPTION OF EMBODIMENTS

Hereinbelow, a database system (hereinafter, referred to as a DB system) will be described as an embodiment according to the present invention. Note that each exemplary embodiment described below is merely an example, and the present invention is not limited to configurations of the exemplary embodiments described below.

[First Exemplary Embodiment]
[System Configuration]

Figure 1:
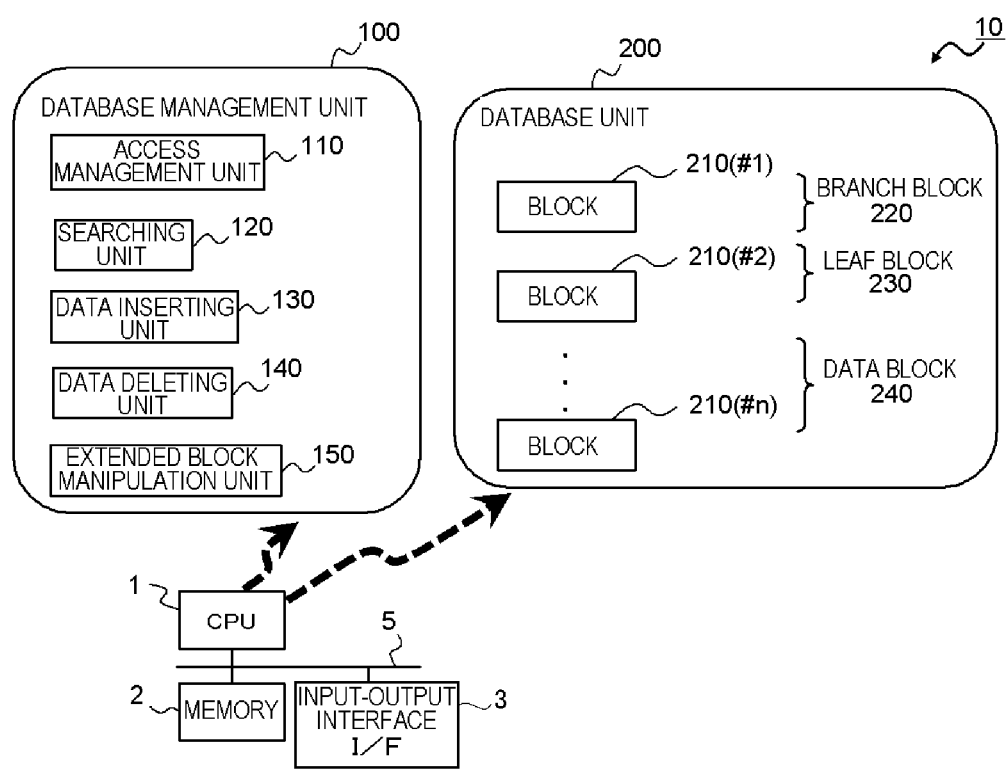
FIG. 1 is a schematic view illustrating an example of a configuration of a database (DB) system according to a first exemplary embodiment.

FIG. 1 is a schematic view illustrating an example of a configuration of a DB system 10 according to a first exemplary embodiment. As illustrated in FIG. 1, the DB system 10 includes, as a hardware configuration, a CPU 1, a memory 2 (for example, a random access memory (RAM), a read only memory (ROM), and a hard disk drive (HDD)), and an input-output interface 3. These hardware elements are connected, for example, through a bus 5. The input-output interface 3 includes a network interface and a user interface for communication with an external computer.

The DB system 10 realizes the following processing units, for example, with the CPU 1 reading and running a program stored in the memory 2. The DB system 10 includes a database management unit (hereinafter, referred to as a DB management unit) 100, and a database (hereinafter, referred to as a DB) unit 200.

It should be noted that, in the example illustrated in FIG. 1, the DB system 10 is realized as one computer. However, the DB system 10 may be realized as plural computers. Further, in the example illustrated in FIG. 1, only one CPU 1 is provided. However, plural processors such as a CPU and a digital signal processor (DSP) may be provided. For example, the DB management unit 100 and the DB unit 200 may be realized on different computers or CPUs. This exemplary embodiment does not apply any limitation on the hardware configuration of the DB system 10.

The DB unit 200 is realized on the memory 2, and includes plural blocks 210 (denoted by 210 (#1), 210 (#2), and 210 (#n) in FIG. 1). Each of the blocks 210 is secured, for example, as a continuous storage area having a predetermined volume (for example, 4 kilo byte (KB)). A portion between the blocks 210 may be secured as the continuous area, or may be secured as a discontinuous area. This exemplary embodiment does not limit the size of the area of each of the blocks 210.

The blocks 210 are generally categorized into blocks that store indexes (hereinafter, referred to as an index block) and blocks 240 that store data (hereinafter, referred to as a data block). The data block 240 stores a given table.

The index blocks have a tree structure (for example, a B-tree (Balanced Tree) structure), and are generally categorized into branch blocks 220 and leaf blocks 230. The branch blocks 220 and the leaf blocks 230 each store at least one entry serving as an index. The entry stored in each of the index blocks may be called an index entry. The index entry includes a key value serving as a searching target and an identifier (ID).

The leaf block 230 is the block that belongs to the lowest layer of all the index blocks. An identifier contained in the entry of each of the leaf blocks is data for identifying any one piece of row data in the data block. The identifier is formed, for example, by a pointer that indicates a head of the row data to be identified, and the size of the row data.

The branch block 220 is a block that has a link to the leaf block 230 or another branch block 220. This link is realized by the identifier of the index entry. More specifically, the identifier contained in the entry of the branch block 220 is a pointer for identifying any one of the branch blocks 220 or any one of the leaf blocks 230. Hereinafter, the branch block 220 on the highest level is also referred to as a root block. In this specification, the highest level represents a level that is searched first during a searching process.

Hereinafter, in each of the index blocks linked with the identifier in the index entry, the branch block 220 containing the index entry is also referred to as a parent block, and the leaf block 230 or another branch block 220 identified on the basis of the identifier in the index entry is also referred to as a child block.

Figure 2:
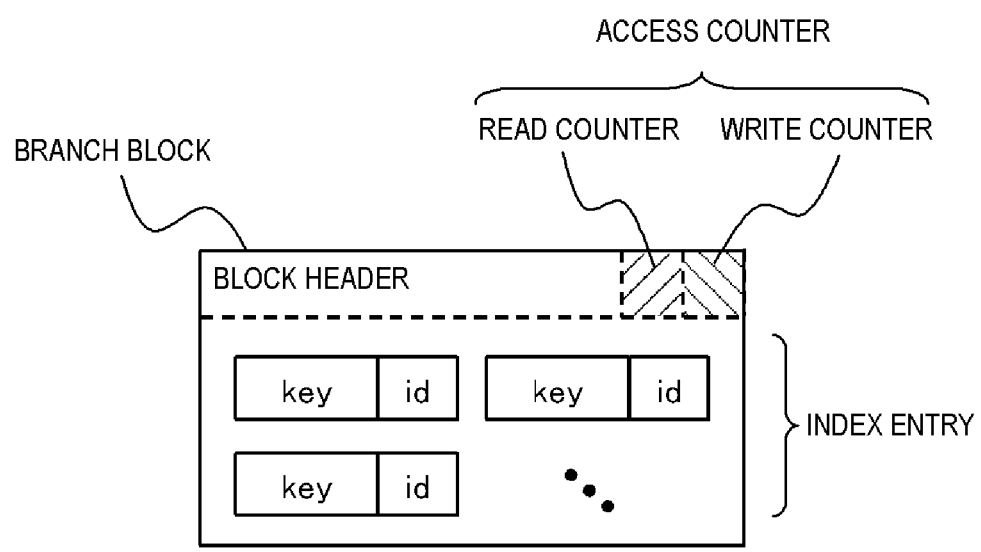
FIG. 2 is a schematic view illustrating an example of a configuration of a branch block.

FIG. 2 is a schematic view illustrating an example of a configuration of a branch block 220. As illustrated in FIG. 2, the branch block 220 contains a block header and at least one index entry. As described above, the index entry contains a key value ("key" in FIG. 2) and an identifier ("id" in FIG. 2). The block header has, for example, a block type and an access counter set therein.

The block type is information, for example, for identifying the leaf block and the branch block. The access counter includes a read counter and a write counter, and counts the total numbers of accesses to the index block. More specifically, the read counter is updated in response to the read access to the branch block 220, and the write counter is updated in response to the update access (adding an entry and deleting an entry) to the branch block 220.

Figure 3:
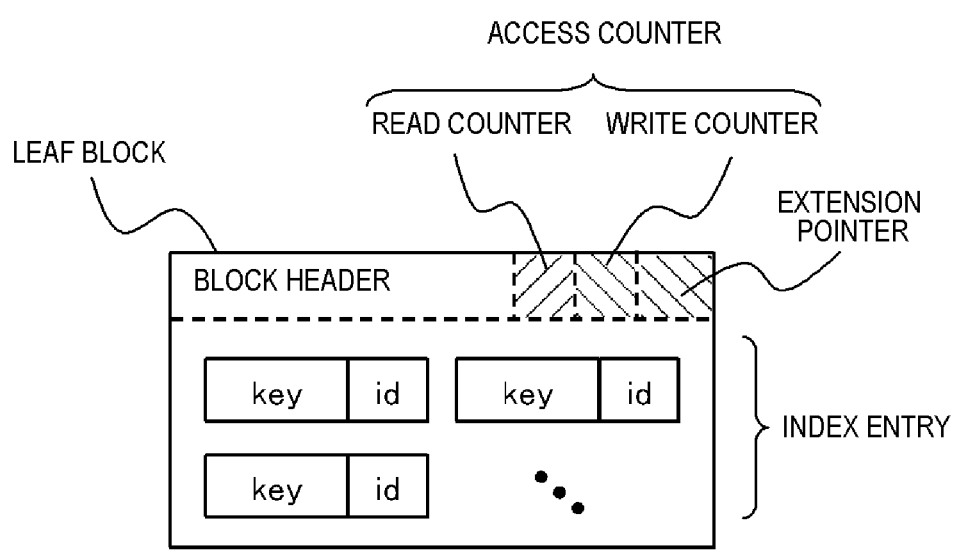
FIG. 3 is a schematic view illustrating an example of a configuration of a leaf block.

FIG. 3 is a schematic view illustrating an example of a configuration of a leaf block 230. As illustrated in FIG. 3, the leaf block 230 is different from the branch block 220 in that the leaf block 230 has an extension pointer in the block header thereof. As for other configurations, the leaf block 230 has similar configurations to those of the branch block 220. The extension pointer is information for identifying an extended block added to extend the size of the leaf block 230. For example, an address of an extended block is set in the extension pointer. Note that an invalid value (for example, NULL) is set to the extension pointer of the leaf block 230 that does not have the extended block. Hereinafter, the expression "extend the leaf block 230" means that the extended block is added to the leaf block 230.

The extended block is one of the above-described blocks 210 realized on the memory 2. As is the case with the leaf block 230, the extended block contains an index entry having an identifier for identifying any one piece of row data in the data block. The extended block is different from the index block in that the extended block is not identified with an index entry of another index block (branch block 220). In the case where plural extended blocks are added to one leaf block 230, an extension pointer for identifying another extended block is set to the extended blocks.

As described above, FIG. 2 and FIG. 3 give an example in which the continuous area in the index block stores each value and each entry in the block header. However, each value and each entry in the block header are not necessarily stored in the continuous area, provided that the value and the entry are associated with each other.

Hereinafter, the branch block 220, the leaf block 230, the data block 240, and the extended block are also simply referred to as a block. Further, the index entry is also simply referred to as an entry.

The DB management unit 100 includes, for example, an access management unit 110, a searching unit 120, a data inserting unit 130, a data deleting unit 140, and an extended block manipulation unit 150. Each of the processing units included in the DB management unit 100 is also realized as a software element with the CPU 1 reading and running a program stored in the memory 2.

The searching unit 120 acquires a search key, and extracts, from the data block 240, a row that contains data on a column (field) corresponding to the acquired search key. This search key may be acquired through communication from another device, or may be acquired from another processing unit such as a process run by the CPU 1, or may be inputted by a user through a user interface.

The searching unit 120 performs an index search to identify the row to be extracted from the data block 240. In this index search, the searching unit 120 first accesses a root block. Of the entries contained in the root block, the searching unit 120 searches for an entry having the maximum key value but less than or equal to the search key, or an entry having the minimum key value but more than or equal to the search key.

The searching unit 120 reads the other branch block 220 or the leaf block 230 identified on the basis of the identifier in the extracted entry. In the case where the other branch block 220 is read, the searching unit 120 extracts a specific entry as is the case with the searching of the root block described above. On the other hand, in the case where the leaf block 230 is read, the searching unit 120 extracts an entry that satisfies conditions of the search key, and extracts, from the data block 240, row data identified on the basis of the identifier of the entry.

In the case where a leaf block 230 is read out and a valid value is set in the extension pointer of the leaf block 230 (leaf block 230 is extended), the searching unit 120 extracts an entry satisfying a condition of the search key from among entries contained in the leaf block 230 and entries contained in the extended block identified on the basis of this extension pointer. In other words, the searching unit 120 treats the extended block as part of an area for storing the index entry of the leaf block 230.

The data inserting unit 130 receives row data to be inserted, and writes the row data into the data block 240. At this time, the data inserting unit 130 updates an index in the index block on the basis of the inserted row data. The row data are written to the data block 240, for example, such that the row data are written into any one of the blocks having available areas of which size is larger than the row data to be inserted.

At the time of updating the index, the data inserting unit 130 adds, to a corresponding leaf block 230, a new index entry corresponding to the inserted row data. This new index entry contains the key value, which is column data located in columns having a key set therein and contained in the inserted row, and further contains an identifier for identifying the inserted row.

In the case where the leaf block 230 serving as the updating target is extended, the data inserting unit 130 adds a new index entry to the extended block of the leaf block 230. Judgment as to whether the leaf block 230 is extended or not is made on the basis of data transmitted from an extended block manipulation unit 150, which will be described later. Note that the data inserting unit 130 also treats the extended block as part of an area for storing the index entry of the leaf block 230.

In updating the index, a new index entry may be requested to be added to the branch block 220 in addition to adding the entry to the leaf block 230. This occurs in a case where the leaf block 230, serving as the insertion target, does not have sufficient available areas for the new index entry to be added (in a case where overflow occurs).

In the case where the overflow occurs as described above, the data inserting unit 130 performs block division to create an available area. At the time of the block division, the data inserting unit 130 transfers part of the data of the leaf block 230 that uses up the available area having a predetermined capacity to a newly prepared leaf block 230 to create the available area. The block division is performed similarly in the branch block 220 as well as in the leaf block 230. Details of the block division will be described in Example of Operation.

The data deleting unit 140 receives a value used for identifying row data to be deleted, deletes the row data from the data block 240, and deletes an index entry corresponding to the deleted row data from the leaf block 230. For example, the value used for identifying the row data to be deleted is acquired as a result of the searching process performed by the searching unit 120. Here, the extended block is treated as part of the area for storing the index entry of the leaf block 230, and hence, even in the case where the index entry serving as the deletion target is stored in the extended block, the data deleting unit 140 deletes the identified entry as deleted in the ordinary process.

In the case where the available data of the leaf block 230 or the extended block becomes more than or equal to a predetermined size by deleting an index entry from this leaf block 230 or this extended block (in the case where underflow occurs), the data deleting unit 140 performs the following processes depending on whether the leaf block 230 is extended or not.

If the leaf block 230 is not extended, the data deleting unit 140 causes this leaf block 230 to be a blank block, and performs a block integrating process if necessary. This block integrating process will be described in more detail in Example of Operation.

On the other hand, if the leaf block 230 is extended, the data deleting unit 140 performs an integrating process for the extended block. More specifically, in the case where it is judged that the leaf block 230 is extended and the underflow occurs in this leaf block 230, the data deleting unit 140 transfers the index entry in the extended block to this leaf block 230. Further, in the case where it is judged that the leaf block 230 is extended and the underflow occurs in the extended block, the data deleting unit 140 transfers the index entry in this extended block to another extended block for the same leaf block 230.

The extended block manipulation unit 150 has a choice between performing the block division to the leaf block 230 or extending the size of the leaf block 230 using the extended block before the data inserting unit 130 performs the block division. The extended block manipulation unit 150 judges whether the ratio of the write access relative to all the accesses to the leaf block 230 having the new index entry added thereto exceeds a predetermined threshold value as a result of the selection described above. More specifically, the extended block manipulation unit 150 divides the value (W) of the write counter by the total value (W+R) of the value of the read counter and the value of the write counter, thereby calculating the ratio (W/(W+R)) of the write access.

If the ratio of this write access exceeds the predetermined threshold value, the extended block manipulation unit 150 selects extending the size of the leaf block 230 using the extended block, and acquires a new extended block. Upon acquiring the extended block, the extended block manipulation unit 150 sets a pointer linked to this extended block to the extension pointer of the leaf block 230. On the other hand, if the ratio of the write access is less than or equal to the predetermined threshold value, the extended block manipulation unit 150 causes the data inserting unit 130 to perform the block division to the leaf block 230.

The predetermined threshold value is stored, for example, in advance in the memory 2 in an adjustable manner. As the predetermined threshold value, x percentile (for example, x is 10) of a ratio of the write access relative to all the accesses in all the index blocks is used, for example.

In the case where the leaf block 230 is read out by the searching unit 120, the extended block manipulation unit 150 refers to the extension pointer of this leaf block 230 and the extension pointer of the extended block to identify all the extended blocks for this leaf block 230. The extended block manipulation unit 150 gives an instruction for the searching unit 120 to search the entries contained in these extended blocks.

In the case where the data deleting unit 140 transfers the index entry between the leaf block 230 and the extended block, or between the extended blocks, the extended block manipulation unit 150 identifies the extended block serving as the target of transfer and the index entry serving as the target of transfer. It is preferable to transfer the index entry between the leaf block 230 and the extended block, and between the extended blocks so as to make the extended block become a blank block. Further, the extended block manipulation unit 150 determines the number of index entries to be transferred in a manner such that the leaf block 230 does not overflow due to the transfer of the index entries.

For each of the index blocks accessed along the tree structure through data manipulation for the data block 240, the access management unit 110 updates the access counters. More specifically, the access management unit 110 updates the read counter of the index block at the time of read access, and updates the write counter of the index block at the time of updating access, according to accesses to the index blocks by the searching unit 120, the data inserting unit 130, and the data deleting unit 140. The updating access includes the operation of inserting the entry, and the operation of deleting the entry. Note that the operation of transferring the entry is realized by combining the operation of inserting the entry and the operation of deleting the entry.

When the searching unit 120 performs the index search to read out the branch block 220 or the leaf block 230 identified on the basis of the identifier in the index entry, the access management unit 110 increases the access counter of the block header in the read-out index block. However, since the root block is a block that is looked up first, the searching unit 120 increases the access counter of the block header in the root block at the time of access.

When the searching unit 120 reads the branch block 220 indicated by the identifier in any of the entries in the root block, the access management unit 110 increases the access counter of this branch block 220 by one. Further, when the searching unit 120 accesses the leaf block 230 traced from this branch block 220, the access management unit 110 increases the access counter of this leaf block 230 by one.

When the data inserting unit 130 adds a new index entry at the time of inserting row data, the access management unit 110 increases, by one, the write counter of the index block having the index entry added thereto. At this time, the access management unit 110 increases, by one, the read counter of each of the index blocks that have been accessed until the index block having the index entry added thereto is obtained.

Similarly, in the case where the block division is performed at the time of inserting row data, the access management unit 110 increases the read counter of the index block accessed in the block division process, and every time an entry is transferred in the block division process, increases, by one, the write counter of the index block serving as the transfer destination.

Further, in the case where the data deleting unit 140 deletes an entry from an index block, the access management unit 110 increases the write counter of the index block. Yet further, in the case where the data deleting unit 140 makes an index block become a blank block, the access management unit 110 increases the write counter of the other index block serving as the transfer destination to which an entry is transferred to make the index block become the blank block.

Here, the extended block is treated as part of the area for storing the index entry of the leaf block 230, and hence, in the case where the entry in the extended block is manipulated, the access counter of the leaf block 230 that has the extended block is updated. More specifically, even in the case where the entry in the extended block is extracted by the searching unit 120, the read counter of the leaf block 230 corresponding to this extended block is updated. Similarly, in the case where a new entry is added to the extended block by the data inserting unit 130, and an entry in the extended block is deleted by the data deleting unit 140, the write counter of the leaf block 230 corresponding to this extended block is updated. Further, in the case where extended blocks are integrated by the data deleting unit 140, the write counter of the leaf block 230 corresponding to this extended block is updated every time when the entries in the extended block are transferred.

[Example of Operation]

Figure 4:
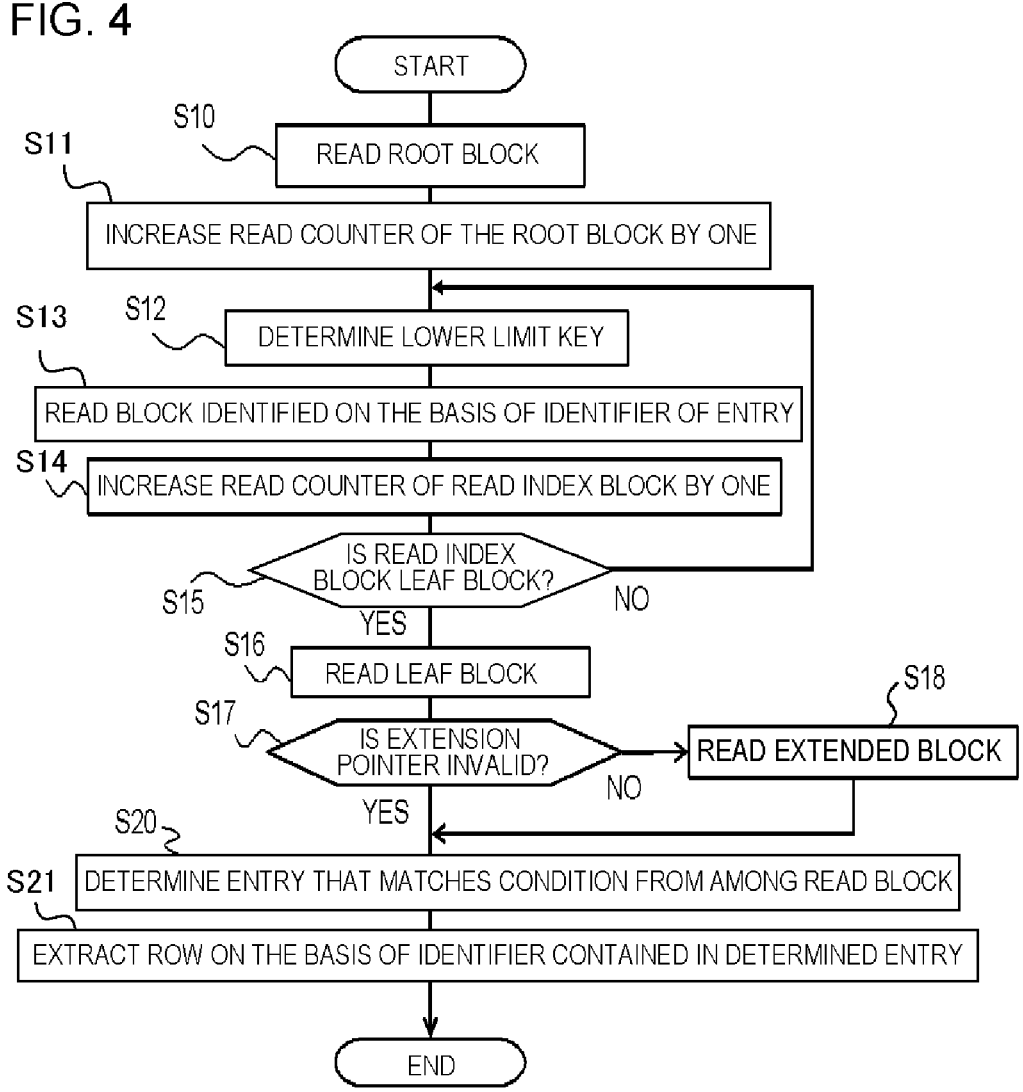
FIG. 4 is a flowchart showing an example of an operation performed by the database (DB) system at the time of data searching according to the first exemplary embodiment.
Figure 5:
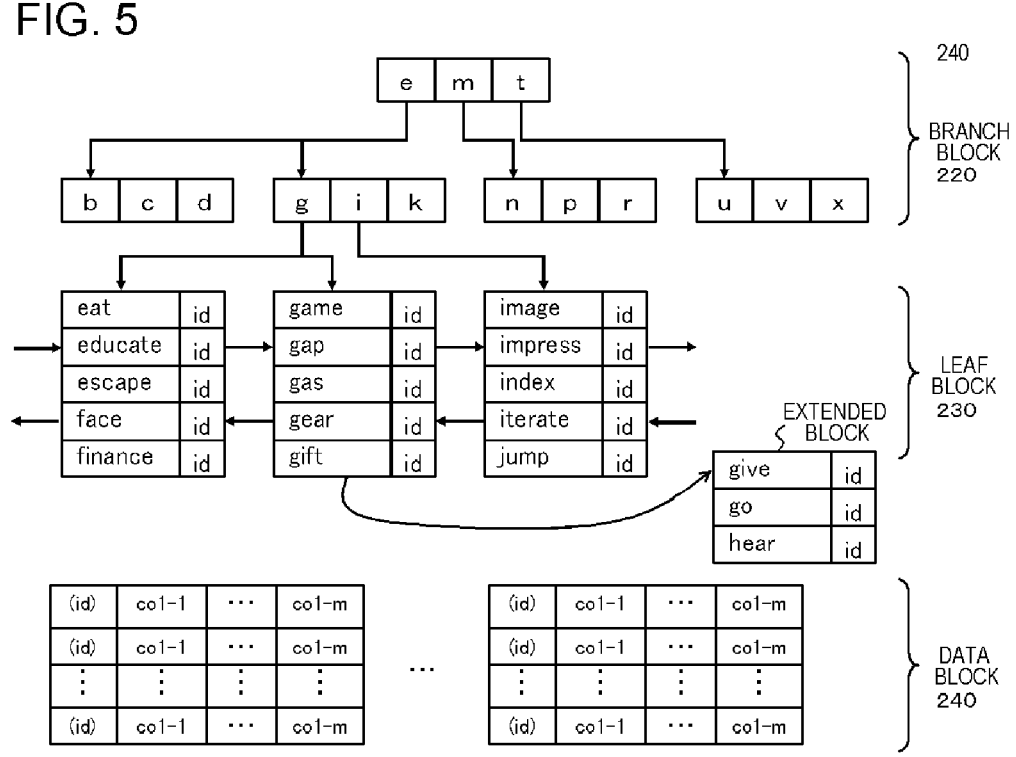
FIG. 5 is a schematic view illustrating an example of a relationship between a branch block, a leaf block, and a data block.

Described below is an example of an operation of the DB system 10 according to the first exemplary embodiment with reference to FIG. 4 to FIG. 7. FIG. 4 is a flowchart showing an example of an operation performed at the time of data searching by the DB system 10 according to the first exemplary embodiment. In the example illustrated in FIG. 4, operations performed at the time of an exact match search are shown. FIG. 5 is a schematic view illustrating an example of a relationship between the branch block 220, the leaf block 230, and the data block 240. With reference to FIG. 5, the example of the operation will be described by giving an example in which the searching unit 120 searches for a row having a search key "go" contained in the column data on the assumption that the sizes of the character strings are compared in alphabetical order.

Upon acquiring a search key, the searching unit 120 reads out a root block (S10). In the example of FIG. 5, upon acquiring a search key "go," the searching unit 120 reads out a root block having index entries containing key values "e," "m," and "t."

Upon access to a root block by the searching unit 120, the access management unit 110 increases the read counter of the root block by one (S11).

Of the index entries in the root block, the searching unit 120 determines an entry having the maximum key value but less than or equal to this search key, or an entry having the minimum key value but more than or equal to this search key. The generality will not be lost if any of the determining methods described above is employed. Thus, in this exemplary embodiment, the searching unit 120 determines an entry having the maximum key value but less than or equal to the search key (S12). This determination of the entry may be realized by comparing all the entries in the blocks, or may be realized by sorting the entries in the blocks in terms of the key values and comparing part of the entries.

Although simplified, as for the key value "e," the example of FIG. 5 includes an entry containing a key value "e" and an entry containing a key value smaller than "e" (for example, NULL). In this example, the maximum key value not more than the search key "go" is "e." The search key "go" is larger than the key value "e" and smaller than the key value "m," and hence, an entry containing an identifier that specifies the second branch block counted from the left end is determined.

Then, the searching unit 120 reads out the index block identified on the basis of the identifier of the entry as determined above (S13).

After the searching unit 120 reads out the index block, the access management unit 110 increases the read counter of the index block by one (S14).

The searching unit 120 judges, on the basis of the block type set in the block header, whether the read-out index block is the leaf block 230 or the branch block 220 (S15). If the read-out index block is judged to be the branch block 220 (NO in S15), the searching unit 120 and the access management unit 110 perform processes of S12, S13 and S14 in connection with the read-out branch block 220.

If the read-out index block is the leaf block 230 (S15;YES), the searching unit 120 acquires the entry in the read-out leaf block 230 (S16). In the example illustrated in FIG. 5, entries (from the entry containing a key value "game" to the entry containing a key value "gift") in the leaf block 230 are acquired.

Next, the extended block manipulation unit 150 judges whether the extension pointer of the read-out leaf block 230 is invalid or not (S17). This judgment is made by judging whether or not the valid value is set to the extension pointer. If it is judged that the extension pointer is valid (S17; NO), the extended block manipulation unit 150 acquires the entry in the extended block identified on the basis of the extension pointer (S18). In the example illustrated in FIG. 5, entries (from the entry containing a key value "give" to the entry containing a key value "hear") in the extended block of the leaf block 230 are acquired.

If the valid value is set to the extension pointer in this extended block, the extended block manipulation unit 150 further acquires the entry in another extended block identified on the basis of this extension pointer. As described above, the extended block manipulation unit 150 acquires the entries in each of the extended blocks related to the read-out leaf block 230 (S18). Note that, if it is judged that the extension pointer of the leaf block 230 is invalid (S17; YES), the searching unit 120 performs the process S20.

The searching unit 120 determines an entry that meets the searching condition including a search key from among the entries in the leaf block 230 acquired in the process S16 and the entries in the extended block acquired in the process S18 (S20). Here, the searching condition indicates search for a row containing a search key in column data (exact match). In the example illustrated in FIG. 5, an index entry containing a key value "go" is determined.

The determination of the index entry may be realized by comparing all the entries in the leaf block 230 and the extended block that this leaf block 230 has, or may be realized by sorting these entries in terms of the key value, and comparing part of the entries.

The searching unit 120 extracts row data identified on the basis of the identifier contained in the determined index entry (S21). In the example of FIG. 5, a row of the data block 240 identified on the basis of the identifier in the index entry containing the key value "go" is extracted. For example, the head of the row data is determined using a pointer contained in the identifier, and data according to the size of the row (number of bytes) are read out from the head address.

Figure 6:
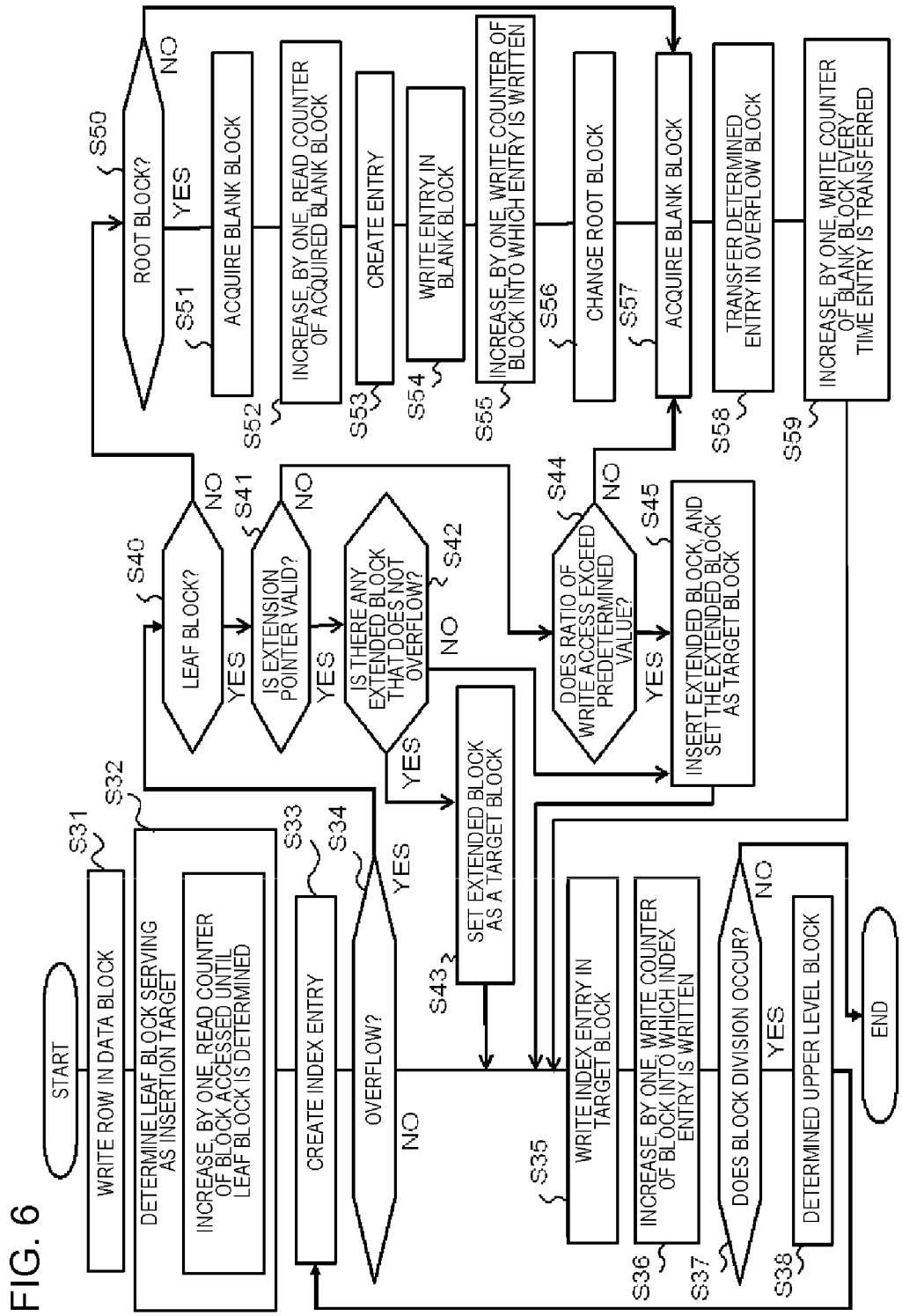
FIG. 6 is a flowchart showing an example of an operation performed by the database (DB) system at the time of data insertion according to the first exemplary embodiment.

FIG. 6 is a flowchart showing an example of an operation performed by the DB system 10 at the time of data insertion according to the first exemplary embodiment.

Upon acquiring row data to be inserted, the data inserting unit 130 writes this row data to a given data block 240 having an available area (S31).

The data inserting unit 130 determines a leaf block 230 into which an index entry corresponding to the inserted row data is to be inserted (S32). This determination of the leaf block 230 is realized in a similar manner to the procedure performed in the case where the leaf block 230 is determined through the index search with the search key being the value of the column located in the inserted row data and having the key set therein. In the case of the example of the operation illustrated in FIG. 4, the leaf block 230 serving as the target of insertion is determined by performing the processes of S10, S11, S12, S13, S14, and S15.

At this time, the access management unit 110 increases the read counter of the index block, which is read-out to identify the leaf block 230 corresponding to the inserted row data.

Then, the data inserting unit 130 generates a new index entry to be inserted into the determined leaf block 230 (S33). The new index entry includes, as the key value, the value of the column located in the inserted row data and having the key set therein, and an identifier for identifying the inserted row data.

The data inserting unit 130 judges whether or not the addition of the new index entry causes the determined leaf block 230 to overflow (S34). In this specification, the overflow means that the available area of the block falls below a predetermined ratio as a result of adding the new index entry.

If judging that the leaf block 230 does not overflow (S34; NO), the data inserting unit 130 writes the newly generated index entry into the determined leaf block 230 (S35). At this time, the access management unit 110 increases, by one, the write counter of the leaf block 230 into which the newly generated index entry is written (S36).

Then, the data inserting unit 130 judges whether the block division is performed (S37). If the block division is not performed (S37; NO), the data inserting unit 130 ends the process, whereas, if the block division is performed (S37; YES), the data inserting unit 130 identifies a branch block located in the upper level than the block subjected to the block division (S38). This identification of the branch block in the upper level may be realized through processes using a recursive function, or may be realized by storing an identifier for the upper level block in the block header.

After this, the data inserting unit 130 returns to the process S33 by using the determined upper level branch block as the target block, and performs each of the processes.

On the other hand, if it is judged that the overflow occurs (S34; YES), the data inserting unit 130 judges whether the index block judged to overflow is the leaf block 230 or not (S40).

If the target index block is not the leaf block 230 (S40; NO), the data inserting unit 130 performs the block division process to the target index block.

In the block division, the data inserting unit 130 first judges whether the index block judged to overflow is the root block or not (S50). If the index block is the root block (S50; YES), the data inserting unit 130 acquires a new blank block serving as a new root block (S51). At this time, the access management unit 110 increases, by one, the read counter of the acquired blank block (S52).

The data inserting unit 130 generates an index entry containing the minimum key value in the current root block that has been judged to overflow and an identifier for identifying this current root block (S53). The data inserting unit 130 writes the index entry generated as described above in the blank block acquired to use it as the new root block (S54). In other words, the generated index entry serves as data for linking the new root block with the original root block (becomes a branch block thereafter).

At this time, the access management unit 110 increases, by one, the write counter of the index block into which the index entry is written (S55).

Then, the data inserting unit 130 changes the root block (S56). More specifically, the data inserting unit 130 changes the root block from the original root block that has been judged to overflow into the newly acquired block. This change is realized, for example, by changing the type of the block in the block header.

Next, the data inserting unit 130 further acquires a blank block (S57). The data inserting unit 130 determines entries that exist in the index block judged to overflow and are to be transferred, and sequentially transfers the determined entries to the acquired blank block (S58). For example, the data inserting unit 130 holds a threshold value in advance, and determines an entry having a key value more than or equal to the threshold value to be a transfer entry from among entries in the index block that has been judged to overflow. For the threshold value, a value less than key values of at least one entry such as a median value is used.

At this time, the access management unit 110 increases, by one, the write counter of the blank block every time the entry is transferred to the blank block (S59).

Then, the data inserting unit 130 writes an index entry generated in the process S33 into an available area created as a result of the transfer of the entry (S35). After this, the data inserting unit 130 and the access management unit 110 perform the process S36 described above and thereafter.

On the other hand, if the index block judged to overflow is the leaf block 230 (S40; YES), the data inserting unit 130 further checks whether the leaf block 230 is extended or not (S41). More specifically, the data inserting unit 130 causes the extended block manipulation unit 150 to judge whether the extension pointer of this leaf block 230 is valid or not (S41). If the leaf block 230 is extended (S41; YES), the data inserting unit 130 further judges whether the leaf block 230 has an extended block that does not overflow even if the index entry generated in the process S33 is inserted therein (S42). At this time, the extended block manipulation unit 150 refers to the extension pointer of this leaf block 230 to determine the extended block for the leaf block 230.

If this leaf block 230 has the extended block that does not overflow (S42; YES), the data inserting unit 130 sets this extended block to be a target block into which the index entry is inserted (S43). On the other hand, if this leaf block 230 does not have the extended block that does not overflow (S42; NO), the extended block manipulation unit 150 acquires a new extended block, and sets the acquired extended block to be the target block into which the index entry is inserted (S45). At this time, the extended block manipulation unit 150 sets a pointer for identifying the acquired extended block to be an extension pointer of this leaf block 230, or sets this pointer for identifying the acquired extended block as the extension pointer that has already existed (S45).

If the leaf block 230 is not extended (S41; NO), the extended block manipulation unit 150 calculates a ratio of the write access relative to all the accesses to this leaf block 230. The extended block manipulation unit 150 judges whether the calculated ratio of the write access exceeds a predetermined threshold value or not (S44).

If the ratio of the write access does not exceed the predetermined threshold value (S44; NO), the extended block manipulation unit 150 causes the data inserting unit 130 to perform the block division process described above to the leaf block 230. With these operations, the data inserting unit 130 performs the processes S57, S58, and S59 described above.

On the other hand, if the ratio of the write access exceeds the predetermined threshold value (S44; YES), the extended block manipulation unit 150 acquires a new extended block, and sets the acquired extended block to be a target block into which the index entry is inserted (S45). At this time, the extended block manipulation unit 150 sets a pointer for identifying the acquired extended block to be an extension pointer of the leaf block 230, or sets this pointer as the extension pointer that has already existed (S45).

After this, the data inserting unit 130 writes the index entry generated in the process S33 into the extended block having the target block for inserting the index entry set in the processes S43 and S45 described above (S35). Then, the data inserting unit 130 and the access management unit 110 perform the process S36 and thereafter described above. Note that, in the case where a new index entry is written into an extended block, the data inserting unit 130 updates the write block of the leaf block 230 corresponding to this extended block.

FIG. 7 is a flowchart showing an example of an operation performed by the DB system 10 at the time of data deletion according to the first exemplary embodiment.

The data deleting unit 140 receives a value for identifying row data to be deleted, and deletes the row data from the data block 240 (S61). The deletion of the row data may be realized by deleting data in the row, or may be realized by adding a value indicating invalid to the row data.

The data deleting unit 140 determines a leaf block 230 having an index entry that identifies the deleted row data (S62). This determination of the leaf block 230 is realized in a similar manner to the procedure performed in the case where the leaf block 230 is determined through the index search with the search key being the value of the column located in the deleted row data and having the key set therein. In the case of the example of the operation illustrated in FIG. 4, the leaf block 230 is determined by performing the processes of S10, S11, S12, S13, S14, and S15.

The data deleting unit 140 deletes the index entry corresponding to the deleted row data in the determined leaf block 230 (S63). At this time, if the determined leaf block 230 is extended, the index entry serving as the target of deletion is determined from among all the entries in the leaf block 230 and the extended block in a manner similar to the processes at the time of data searching. Further, at this time, the access management unit 110 increases the write counter of the leaf block 230 from which the index entry is deleted (S64). If the deleted index entry exists in the extended block, the write counter of the leaf block 230 corresponding to the extended block is updated.

The data deleting unit 140 judges whether or not the underflow occurs in the leaf block 230 or the extended block from which the entry is deleted (S65). If the underflow does not occur (S65; NO), the data deleting unit 140 ends the process.

If the data deleting unit 140 judges that the underflow occurs (S65; YES), the extended block manipulation unit 150 judges whether an invalid value is set in the extension pointer of the leaf block 230 identified as the target of deletion (S66). If the invalid value is set in the extension pointer (S66; YES), the data deleting unit 140 transfers the entry remaining in the leaf block 230 to another leaf block 230, and makes the leaf block 230 become blank (S67). At this time, the access management unit 110 increases, by one, the write counter of the leaf block 230 serving as a destination of transfer of the entry (S68).

It should be noted that the blocks serving as the destination of transfer may be one or may be plural, and the blocks may be selected through various methods. Further, in the case where the leaf block 230 serving as the destination of transfer is extended, the extended block for the leaf block 230 serving as the destination of transfer may be set as the block serving as the destination of transfer. In this case, since the extended block is treated as part of the area for storing the index entry of the leaf block 230, even if the area that stores the transferred entry is located in the extended block, the process of transferring this entry can be realized through a process similar to an ordinary process of transferring entries.

The data deleting unit 140 sets the access counters (the read counter and the write counter) of the leaf block 230 that becomes the blank block to be zero. By changing into the blank block, this block can be reused by the data inserting unit 130 or the extended block manipulation unit 150. Further, each of the access counters of the leaf block 230 that becomes the blank block may be integrated into access counters of the block serving as the destination of the transfer.

Then, the data deleting unit 140 judges whether or not the blocks can be integrated (S69). More specifically, the data deleting unit 140 judges whether or not all entries in all child blocks hanging from a parent block (branch block 220) of the leaf block 230 that becomes the blank block can be put into this parent block (S69).

If it is judged that the blocks cannot be integrated (S69; NO), the data deleting unit 140 ends the process. On the other hand, if it is judged that the blocks can be integrated (S69; YES), the data deleting unit 140 integrates the blocks (S70).

In other words, all the entries in the child block are transferred to the parent block while the entries existing in the parent block are deleted. As a result, all the child blocks hanging from the parent block are changed into the blank blocks.

At this time, the access management unit 110 increases, by one, the write counter of the upper block (S71). Note that the value of the access counters of the integrated child blocks may be integrated into the access counters of the parent block.

On the other hand, if the valid value is set in the extension pointer of the leaf block 230 identified as the target of deletion (S66; NO), the extended block manipulation unit 150 determines the entry to be transferred and the destination of transfer, and the data deleting unit 140 sequentially transfers the entry to be transferred to the block serving as the destination of transfer (S72). With this operation, for the leaf block 230 that is in the underflow state, the entry can be transferred between the extended blocks or between the extended block and the leaf block 230.

At this time, if the leaf block 230 itself is in the underflow state, the extended block manipulation unit 150 determines the index entry in the extended block to be the target of transfer, and determines this leaf block 230 in the underflow state to be the destination of transfer. Further, if the extended block is in the underflow state, the extended block manipulation unit 150 determines the entry in this extended block as the target of transfer, and determines another extended block for the same leaf block 230 as the destination of transfer.

The access management unit 110 increases the write counter of the corresponding leaf block 230 every time an entry is transferred (S73).

[Operation and Effect of First Exemplary Embodiment]

As described above, in the first exemplary embodiment, each of the index blocks has the read counter and the write counter, and the read counter and the write counter of the index block that have been accessed by the searching unit 120, the data inserting unit 130, and the data deleting unit 140 in response to the data manipulation of the data block 240 are updated by the access management unit 110. As described above, according to the first exemplary embodiment, the number of accesses to each of the index blocks is managed separately according to the read access and the write access.

Further, in the first exemplary embodiment, when the data insertion process is performed by the data inserting unit 130, it is judged by the extended block manipulation unit 150 whether the ratio of the write access relative to all the accesses to the leaf block 230 serving as the target of insertion exceeds the predetermined threshold value. If the ratio of the write access exceeds the predetermined threshold value, the extended block is added to this leaf block 230. Unlike the index block, this extended block is not identified on the basis of the index entry in another block, and is identified on the basis of the extension pointer of the leaf block 230.

During the operation for the index entry performed by the searching unit 120, the data inserting unit 130, and the data deleting unit 140, this extended block is treated as part of the area for storing the index entry of the leaf block 230 that has the extension pointer for identifying this extended block set therein. Further, if the underflow occurs in the leaf block 230, block integration is performed between the leaf block 230 and the extended block, or between the extended blocks.

As described above, according to the first exemplary embodiment, in the case where the leaf block 230 having the increased ratio of the write access is judged to overflow, an extended block, which does not require any index entry for identifying this extended block itself to be set in another block, is added to this leaf block 230, and the area for storing the index entry of the leaf block 230 is extended.

Thus, according to the first exemplary embodiment, it is possible to increase the speed of inserting the data by using the extended block that does not affect the entry in another block. However, use of the extended block leads to an increase in the entries serving as a target of searching, and hence, the speed of searching the leaf block 230 extended with the extended block decreases. In this respect, according to the first exemplary embodiment, it is possible to optimize the performance of the system as a whole by adding the extended block only to blocks having the increased write access. Note that the above-described right-growing index is a typical example in which the ratio of the write access differs between the index blocks.

[Second Exemplary Embodiment]

Below, the DB system 10 according to a second exemplary embodiment will be described. In addition to the configuration of the first exemplary embodiment, the second exemplary embodiment further includes a configuration in which the extended block is changed to be the leaf block 230 according to the ratio of the read access. In the second exemplary embodiment, the DB system 10 has a configuration similar to that in the first exemplary embodiment. However, the processes of the processing units are different from those in the first exemplary embodiment. Below, the DB system 10 according to the second exemplary embodiment will be described with focus being placed on things different from the first exemplary embodiment, and explanation of the details same as the first exemplary embodiment will not be repeated.

The extended block manipulation unit 150 judges whether the ratio of the read access relative to all the accesses to the leaf block 230 having the extended block exceeds a predetermined threshold value, and if the ratio of the read access exceeds the predetermined threshold value, sets the extended block so as to be the leaf block 230. More specifically, the extended block manipulation unit 150 divides the value (R) of the read counter by the total (R+W) of the value of the read counter and the value of the write counter to calculate a ratio (R/(R+W)) of the read access. Note that details of the process for setting the extended block so as to be the leaf block 230 will be described in Example of Operation.

The predetermined threshold value to be compared with the ratio of the read access is stored in the memory 2 in an adjustable manner together with the predetermined threshold value used for comparing with the ratio of the write access in the first exemplary embodiment. For the predetermined threshold value to be compared with the ratio of the read access, x percentile (for example, x is 10) of a ratio of the read access relative to all the accesses in all the index blocks is used, for example. Note that the predetermined threshold value to be compared with the ratio of the read access and the predetermined threshold value used for comparing with the ratio of the write access in the first exemplary embodiment may be a single value.

[Example of Operation]

FIG. 8 is a flowchart showing an example of an operation performed by the DB system 10 according to the second exemplary embodiment. In FIG. 8, the same reference characters as those in FIG. 4 are attached to the processes same as those performed by the DB system 10 according to the first exemplary embodiment at the time of data searching.

The DB system 10 according to the second exemplary embodiment performs the processes from S10 to S21 at the time of data searching, which are similar to those in the first exemplary embodiment. Once the row data identified on the basis of the identifier contained in the index entry are extracted by the searching unit 120 (S21), the extended block manipulation unit 150 judges whether the valid value is set in the extension pointer of the identified leaf block 230, and whether the ratio of the read access exceeds the predetermined threshold value (S81).

If the invalid value is set in the extension pointer of the identified leaf block 230, or the ratio of the read access relative to all the accesses is less than or equal to the predetermined threshold value (S81; NO), the extended block manipulation unit 150 ends the processes. On the other hand, if the valid value is set in the extension pointer of the identified leaf block 230 and the ratio of the read access exceeds the predetermined threshold value (S81; YES), the extended block manipulation unit 150 sets the extended block that the leaf block 230 has so as to be the index block (S82).

In the process S82, the extended block manipulation unit 150 sets an invalid value in the extension pointer for identifying this extended block in the leaf block 230. Further, the extended block manipulation unit 150 sets this extended block so as to have a form as illustrated in FIG. 3. For example, the extended block manipulation unit 150 sets the block type in the block header so as to indicate the leaf block 230, and sets the block header so as to have the read counter and the write counter. Note that the extended block may be provided in advance with a block header similar to that of the leaf block 230. In this case, it is only necessary that the block header of the extended block is not used for the purposes other than as the extension pointer.

The extended block manipulation unit 150 further sorts all the entries stored in the leaf block 230 and the extended block used for extending the leaf block 230 using the key value, stores, in the leaf block 230, a predetermined number of the entries counted from the entry having the minimum key value, and stores the other entries to the extended block. The predetermined number described above is set, for example, to a value obtained by dividing the number of all the entries by the number of the leaf blocks 230 and the extended blocks.

After sorting the entries as described above, the extended block manipulation unit 150 instructs the data inserting unit 130 to add an index entry containing an identifier for identifying the extended block to the branch block 220. In response to this instruction, the data inserting unit 130 performs, to this extended block, a process similar to a process of inserting a new block generated through the block division. More specifically, the data inserting unit 130 performs the process S38 and thereafter illustrated in FIG. 6.

In the case where the leaf block 230 is extended with plural extended blocks, the process S82 described above is performed for all the extended blocks.

Further, the order of the processes S81 and S82 of setting the extended block as described above to be the index block is not limited to that illustrated in FIG. 8. For example, the processes S81 and S82 may be performed in parallel to the process S21 performed by the searching unit 120. Further, the processes S81 and S82 may be performed for all the leaf blocks 230 at any timing (for example, periodically) independently of the data searching process.

[Operation and Effect of Second Exemplary Embodiment]

As described above, in the second exemplary embodiment, the extended block added to increase the data insertion speed is set to be the leaf block 230 in the case where the ratio of the read access exceeds the predetermined threshold value. In other words, in the second exemplary embodiment, the extended block is added to the leaf block 230 having the increased ratio of the write access, and if the ratio of the read access of this leaf block 230 increases, this extended block is set so as to be the leaf block 230.

Since the leaf block 230 and the branch block 220 store keys having close values, and hence, in the case where the keys in the specific range are inserted frequently, the write access concentrates on the corresponding block. Further, in the case where the keys in the specific range are searched frequently, the read access concentrates on the corresponding block. Thus, both a block whose searching speed should be increased by setting up indexes, and a block whose inserting speed should be increased without setting up indexes can exist.

According to the second exemplary embodiment, whether the block having indexes applied thereto and the block (extended block) not having indexes applied thereto are determined according to the ratio of the accesses. Thus, even if the block frequently receiving the write access and the block frequently receiving the read access are mixed, it is possible to efficiently process data. In other words, even in the case where the ratio of read access to write access changes according to the range of the key values, it is possible to achieve high processing performance. Further, according to the second exemplary embodiment, it is possible to dynamically follow the changes in the ratio of access, whereby it is possible to sufficiently achieve the performance required even if the workload changes.

Next, operations and effects obtained from the first exemplary embodiment and the second exemplary embodiment will be described below using specific examples. For example, it is assumed, as an example, that the data block 240 stores a sales statement table, product numbers in this sales statement table are set as the key value, and processes of insertion and searching (calculation) for the sales statement are performed. Further, in this example, it is assumed that the write access occurs at a percentage of 5% to 15% in each of the leaf blocks 230, and the predetermined threshold value used for judging whether to extend the leaf block 230 is set to 25%.

In this example, in the case where a bargain sale is held for a product with a product number "1300" and sales of this bargain product increase, the write access (inserting rows) to a leaf block 230 that records the sales of products with a product number, for example, ranging from "1000" to "1999" increases. At this time, there is no significant change in the steady-state read access, and if the ratio of the write access increases to 30%, an extended block is added to this leaf block 230.

According to the exemplary embodiments, for the temporary and partial increase in the write access, it is possible to increase the speed of the process for the write access while reducing the speed of the process for the read access in an automatic manner. Thus, according to the exemplary embodiments, as a result of the speed up of the process for the increased write access, performance of the system as a whole improves. Further, if the ratio of the write access decreases as a result of the end of the bargain sale, the extended block is set so as to be a normal leaf block 230. Thus, the indexes are added to the leaf block 230, and the speed of the process for the read access increases.

Further, the exemplary embodiments are effective in the problem of the right-growing index. For example, in the case where a data table stored in the data block 240 has a column indicating the current time, and the column indicating this current time is set as the key, the write access concentrates on the first leaf block 230 counted from the right and indicating the latest time. In the exemplary embodiments, the extended block is added to this leaf block 230, and hence, it is possible to increase the speed of the process performed for the write access for updating the current time.

The number of the read accesses occurring every time this leaf block 230 and the extended block are searched increases as the number of the extended blocks increases. For example, in the case where nine extended blocks are added to a certain leaf block 230, ten read accesses occur for each searching. On the other hand, basically, one write access occurs when one row is inserted. Thus, the ratio of the write access tends to decrease. The extended block is set so as to become the leaf block 230 once the ratio falls to some degree. Thus, a new leaf block 230 is added to the far right, and a key indicating the latest time is inserted. Note that, in general, it is more efficient to insert a group of blocks rather than inserting one block at a time.

[Modification Example]

In the first exemplary embodiment described above, the judgment over whether to extend the leaf block 230 is made on the basis of the result of comparison between the ratio of the write access relative to all the accesses in this leaf block 230 and the predetermined threshold value. However, it may be possible to simply judge the leaf block 230 to be extended if the write counter is higher than the read counter. Further, it may be possible to judge over whether to extend the leaf block 230 by comparing the ratio of the write counter relative to the read counter with a predetermined threshold value.

Further, in the second exemplary embodiment described above, the judgment over whether to set the extended block so as to be the leaf block 230 is made on the basis of the result of comparison between the ratio of the read access relative to all the accesses in this leaf block 230 and the predetermined threshold value. However, it may be possible to simply judge the extended block to be set so as to be the leaf block 230 if the read counter is higher than the write counter. Further, it may be possible to judge whether to set the extended block to be the leaf block 230 by comparing the ratio of the read counter relative to the write counter with a predetermined threshold value.

Yet further, in each of the exemplary embodiments described above, one extension pointer is provided to the leaf block 230 and each of the extended blocks. However, it may be possible to employ a configuration in which no extension pointer is provided to the extended block and plural extension pointers are provided to the leaf block 230.

Yet further, in each of the exemplary embodiments, the access counter (including the read counter and the write counter) is increased by one. However, this increment may vary depending on access types or other factors.

It should be noted that the exemplary embodiments have been described with reference to plural flowcharts, and plural steps (processes) are described in a sequential order. However, the order of the steps performed in the exemplary embodiments is not limited to the order of the steps illustrated in the drawings. In the exemplary embodiments, the order of the process steps illustrated in the drawings may be exchanged, provided that the exchange does not impair the details of the processes. The above-described exemplary embodiments and the modification example may be combined, provided that the details thereof do not contradict each other.

The present application claims priority based on Japanese Patent Application No. 2011-035437 filed in Japan on Feb. 22, 2011, the disclosures of which are incorporated herein by reference in their entirety.

The invention claimed is:

1. A database management device that manages a database containing a data block storing tabular data, comprising:
a plurality of index blocks having a tree structure, and each having at least one index entry for identifying one piece of row data constituting the tabular data or another index block, and an access counter including a read counter and a write counter;
an access management unit that updates the read counter in response to a read access to an index block and updates the write counter in response to an update access to the index block for each of the index blocks accessed along the tree structure in response to data manipulation of the tabular data;
a data inserting unit that inserts a new index entry for identifying new row data to be inserted into the data block, into a leaf block serving as a target of insertion from among the plurality of index blocks; and
an extended block manipulation unit that, based on a result of comparison between the read counter and the write counter in the leaf block serving as the target of insertion, acquires an extended block not identified with an index entry of another index block and serving as a destination of storing the new index entry, and sets identification information for identifying the extended block to the leaf block serving as the target of insertion.

2. The database management device according to claim 1, wherein
the extended block manipulation unit sets the extended block so as to be a leaf block identified based on the index entry of the other index block, based on a result of comparison between the write counter and the read counter in the leaf block serving as the target of insertion.

3. The database management device according to claim 2, wherein
the extended block manipulation unit judges whether a ratio of the read access relative to all accesses in the leaf block serving as the target of insertion exceeds a predetermined threshold value based on the read counter and the write counter, and if the ratio of the read access exceeds the predetermined threshold value, sets the extended block so as to be a leaf block identified with the index entry of the other index block.

4. The database management device according to claim 1, wherein
the extended block manipulation unit judges whether a ratio of the write access relative to all accesses in the leaf block serving as the target of insertion exceeds a predetermined threshold value based on the read counter and the write counter, and if the ratio of the write access exceeds the predetermined threshold value, acquires an extended block not identified with the index entry of the other index block.

5. The database management device according to claim 1, wherein
if access occurs to the index entry stored in the extended block, the access management unit updates the access counter of the leaf block having the identification information for identifying the extended block set therein.

6. A non-transitory computer-readable storage medium storing a program that manages a database containing a data block storing tabular data for causing a computer to realize:
a plurality of index blocks having a tree structure, and each having at least one index entry for identifying one piece of row data constituting the tabular data or another index block, and an access counter including a read counter and a write counter;
an access management unit that updates the read counter in response to a read access to an index block and updates a write counter in response to an update access to the index block for each of the index blocks accessed along the tree structure in response to data manipulation of the tabular data;

a data inserting unit that inserts a new index entry for identifying new row data to be inserted into the data block, into a leaf block serving as a target of insertion from among the plurality of index blocks; and an extended block manipulation unit that, based on a result of comparison between the read counter and the write counter in the leaf block serving as the target of insertion, acquires an extended block not identified with an index entry of another index block and serving as a destination of storing the new index entry, and sets identification information for identifying the extended block to the leaf block serving as the target of insertion.

7. The non-transitory computer-readable storage medium according to claim 6, wherein the extended block manipulation unit sets the extended block so as to be a leaf block identified based on the index entry of the other index block, based on a result of comparison between the write counter and the read counter in the leaf block serving as the target of insertion.

8. A database management method that manages a database containing a data block storing tabular data and is performed by a computer, comprising:

storing a plurality of index blocks having a tree structure, and each having at least one index entry for identifying one piece of row data constituting the tabular data or another index block, and an access counter including a read counter and a write counter:

updating the read counter in response to a read access to an index block and updates the write counter in response to an update access to the index block for each of the index blocks accessed along the tree structure in response to data manipulation of the tabular data;

inserting a new index entry for identifying new row data to be inserted into the data block, into a leaf block serving as a target of insertion from among the plurality of index blocks;

acquiring an extended block not identified with an index entry of another index block and serving as a destination of storing the new index entry, based on a result of comparison between the read counter and the write counter in the leaf block serving as the target of insertion; and setting identification information for identifying the extended block to the leaf block serving as the target of insertion.

9. The database management method according to claim 8, wherein the computer further sets the extended block so as to be a leaf block identified based on the index entry of the other index block, based on a result of comparison between the write counter and the read counter in the leaf block serving as the target of insertion.

* * * * *